(12) United States Patent
Flick

(10) Patent No.: US 9,238,449 B2
(45) Date of Patent: Jan. 19, 2016

(54) VEHICLE CONTROL SYSTEM INCLUDING ACCELEROMETER BASED SECURITY WARNING AND RELATED METHODS

(71) Applicant: Omega Patents, L.L.C., Douglasville, GA (US)

(72) Inventor: Kenneth E. Flick, Douglasville, GA (US)

(73) Assignee: OMEGA PATENTS, L.L.C., Douglasville, GA (US)

( * ) Notice: Subject to any disclaimer, the term of this patent is extended or adjusted under 35 U.S.C. 154(b) by 55 days.

(21) Appl. No.: 14/198,681

(22) Filed: Mar. 6, 2014

(65) Prior Publication Data

US 2015/0251633 A1 Sep. 10, 2015

(51) Int. Cl.
*B60R 25/10* (2013.01)
*B60R 25/30* (2013.01)

(52) U.S. Cl.
CPC .......... *B60R 25/1004* (2013.01); *B60R 25/30* (2013.01)

(58) Field of Classification Search
CPC .............. B60R 25/102; B60R 2325/205
USPC ............ 340/429, 435, 438, 426.1, 541
See application file for complete search history.

(56) References Cited

U.S. PATENT DOCUMENTS

| | | | |
|---|---|---|---|
| 4,383,242 A | 5/1983 | Sassover et al. | |
| 5,146,215 A | 9/1992 | Drori | |
| 5,252,966 A | 10/1993 | Lambropoulos et al. | |
| 5,532,670 A | 7/1996 | Issa et al. | |
| 5,646,591 A | 7/1997 | Issa et al. | |
| 6,397,133 B1 * | 5/2002 | van der Pol et al. | 701/37 |
| 7,489,233 B2 | 2/2009 | Flick | |
| 7,501,937 B2 | 3/2009 | Flick | |
| 7,576,637 B2 | 8/2009 | Flick | |
| 7,659,811 B2 | 2/2010 | Flick | |
| 8,432,268 B2 | 4/2013 | Flick | |
| 8,749,374 B2 * | 6/2014 | Yamamura et al. | 340/539.1 |
| 2010/0311385 A1 * | 12/2010 | Hurwitz | 455/404.1 |

* cited by examiner

*Primary Examiner* — Tai T Nguyen
(74) *Attorney, Agent, or Firm* — Allen, Dyer, Doppelt, Milbrath & Gilchrist, P.A.

(57) ABSTRACT

A vehicle control system may include a wireless communications device, a vehicle position determining device, and an accelerometer. The vehicle control system may also include at least one controller configured to communicate vehicle position information based upon the vehicle position determining device via the wireless communications device, and communicate vehicle acceleration data based upon the accelerometer via the wireless communications device. The controller may also be configured to generate a security pre-warning signal based upon the accelerometer.

36 Claims, 5 Drawing Sheets

VEHICLE CONTROL SYSTEM INCLUDING ACCELEROMETER BASED SECURITY WARNING AND RELATED METHODS

FIELD OF THE INVENTION

The present invention is related to the field of vehicle control systems, and, more particularly to a security system for a vehicle and related methods.

BACKGROUND

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function, U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

In addition to providing an alarm indication, certain prior art security systems also provide a pre-warning indication which has a lesser volume or shorter duration than the alarm indication. The pre-warning indication is generally triggered by a sensed security threat level that is below a high security threat level needed to trigger the alarm indication. These high and low threat levels may be sensed using a two-stage shock sensor, for example.

The pre-warning feature is particularly advantageous for warning someone who comes too close to, or makes contact with, the vehicle that the vehicle has a security system that can trigger a much more conspicuous alarm indication. Accordingly, if a would-be burglar bumps a vehicle window in an attempt to pick the door lock, a pre-warning indication is triggered to inform the perpetrator that breaking the window or opening the door will result in an alarm indication, and possibly other countermeasures as well.

Additionally, knowing the locations of a vehicle is often desired. For example, should a vehicle be stolen or involved in a crash, it would be beneficial to know the vehicle's location so that authorities may be promptly and accurately directed to retrieve or attend to the vehicle.

SUMMARY

A vehicle control system may include a wireless communications device, and a vehicle position determining device. The vehicle control system may also include an accelerometer and at least one controller. The at least one controller may be configured to communicate vehicle position information based upon the vehicle position determining device via the wireless communications device and communicate vehicle acceleration data based upon the accelerometer via the wireless communications device. The at least one controller may also be configured to generate a security warning signal based upon the accelerometer. The at least one controller may be configured to generate a crash alert based upon the accelerometer. Accordingly, the vehicle control system may provide increased security by generating warning signals based upon the accelerometer, for example, which may also be for detecting a vehicle crash.

The at least one controller may be configured to generate a crash alert based upon the accelerometer. The at least one controller may be configured to cooperate with the wireless communications device to send the security warning signal remote from the vehicle, for example.

The security warning signal may include a security pre-warning signal. The security warning signal may alternatively or additionally include a security full-warning signal.

The vehicle control system may be for a vehicle having a data communications bus extending throughout the vehicle, for example. The at least one controller may be coupled to the data communications bus. The vehicle acceleration data may be communicated over the data communications bus, for example.

The vehicle control system may further include a security warning indicator coupled to the at least one controller to generate a security warning indication at the vehicle based upon the security warning signal. The security warning signal may also be communicated over the data communications bus. The security warning indicator may be an audible security warning indicator. Alternatively or additionally, the security warning indicator may be a visual security warning indicator, for example.

The wireless communications device may include a cellular communications device, for example. The vehicle position determining device may include a global positioning system (GPS) device. The accelerometer may be at least one microelectromechanical system (MEMS) device, for example. The at least one controller may include a tracking controller and a security controller cooperating therewith.

A method aspect is directed to a method of generating a security warning signal for a vehicle control system that includes a wireless communications device, a vehicle position determining device, an accelerometer, and at least one controller configured to communicate vehicle position information from the vehicle position determining device via the wireless communications device and communicate communicating vehicle acceleration data from the accelerometer via the wireless communications device. The method may include using the at least one controller to generate the security warning signal based upon the accelerometer.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to refer to like elements in different embodiments.

Figure 1:
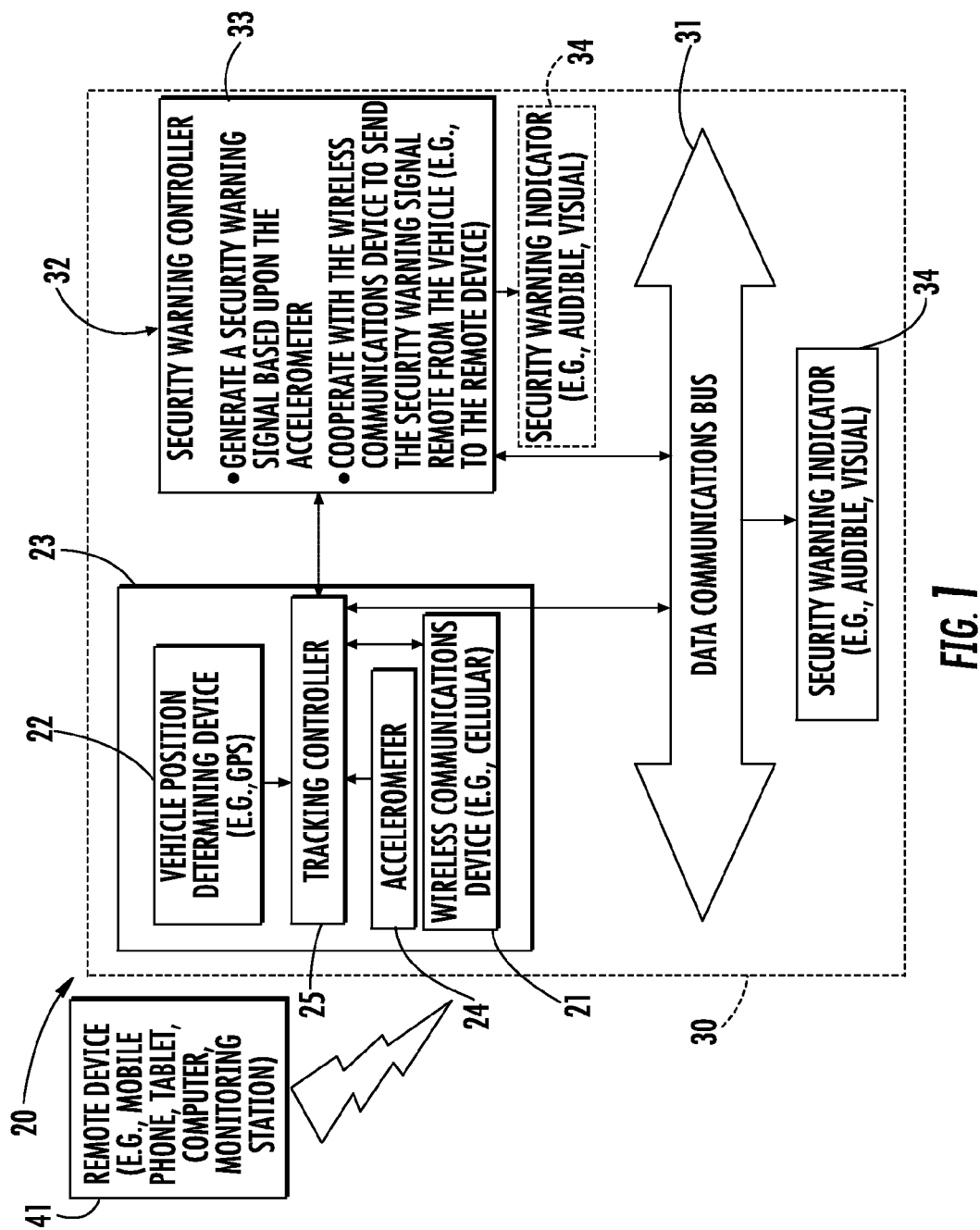
FIG. 1 is a schematic diagram of a vehicle control system in accordance with an embodiment of the present invention.

Referring initially to FIG. 1, a vehicle control system 20 for a vehicle 30 having a data communications bus 31 extending throughout the vehicle includes a wireless communications device 21. The wireless communications device 21 may be a cellular communications device. Of course, the wireless communications device 21 may be another type of wireless communications device, for example, and may be either or both of long range and short range, as will be appreciated by those skilled in the art.

The wireless communications device 21 may communicate with a remote device 41 that is remote from the vehicle 30. For example, the remote device 41 may be a mobile wireless communications device, a computer, a tablet, and/or a central station. Of course, the remote device 41 can be any type of remote device and may be communicate, i.e., either or both of receiving and sending data, to the wireless communications device. More than one remote device 41 may be used and communicate with the wireless communications device 21.

The vehicle control system 20 also includes a vehicle position determining device 22 that may be carried by a first housing 23. The vehicle position determining device 22 may be a GPS device, for example. Of course, the vehicle position determining device 22 may be another type of vehicle position determining device, such as based upon cellular tower location techniques.

The vehicle control system 20 also includes an accelerometer 24 also carried by the first housing 23. The accelerometer 24 may be a MEMS accelerometer, for example, or other circuitry for sensing acceleration of the vehicle 30. The MEMS accelerometer may also sense multiple directions/axes of acceleration. A tracking controller 25 is coupled to the vehicle position determining device 22 and the accelerometer 24 and may be carried by the first housing 23. The tracking controller 25 may be coupled to the data communications bus 31. The tracking controller 25 is configured to communicate vehicle position information based upon the vehicle position determining device 22 via the wireless communications device 21, for example to the remote device 41. The tracking controller 25 is also configured to communicate vehicle acceleration data based upon the accelerometer 24 also via the wireless communications device 21. Vehicle acceleration data may be communicated via the data communications bus 31. For example, the tracking controller 25 may be particularly useful for determining, based upon the accelerometer 24, a vehicle crash and wirelessly sending position information to the remote device 40, which may be in the form of a central station so that emergency services may be notified. Crash detection may be enabled upon engine starting, and during vehicle movement, for example. This functionality may be included from the vehicle manufacturer with many new vehicles. Additionally, the tracking controller 25 may be particularly useful for determining whether a driver has left the roadway based upon a relatively high acceleration from the accelerometer 24.

The vehicle control system 20 also includes a security warning controller 32 carried by a second housing 33 and coupled to the data communications bus 31. The security warning controller 32 is configured to generate a security warning signal based upon the accelerometer 24, which may be communicated over the data communications bus. For example, the security warning controller 32 may generate the security warning signal based when a person or object bumps, taps, or otherwise comes in contact with the vehicle 30.

The vehicle control system 20 may also include a security warning indicator 34 at the vehicle, i.e., local. The security warning indicator 34 may be coupled to the data communications bus 31. In some embodiments, the security warning indicator 34 may not be coupled to the data communications bus 31, and, for example, may be hardwire coupled to the security warning controller 32. The vehicle control system 20 may also include more than one security warning indicator 34 at the vehicle each coupled to either of the data communications bus 31 and the security warning controller 32.

The security warning indicator 34 generates a security indication, particularly, a local security indication, for example, which may be in the form of an audible indication and/or a visual indication at the vehicle, based upon the security warning signal. For example, the security indication may be a siren, the vehicle horn, headlights, and/or operation of the air-based suspension, or other local alert.

In some embodiments, the security warning controller 32 may also communicate via the tracking controller 25 to wirelessly send the security warning signal to the remote device 41 via the wireless communications device 21 so that the remote device operates as a remote security warning indicator remote from the vehicle 30. Of course, the security warning indicator 34 may generate other or additional types of security indications, as will be appreciated by those skilled in the art. The vehicle control system 20 may include more than one security warning indicator 34.

Figure 2:
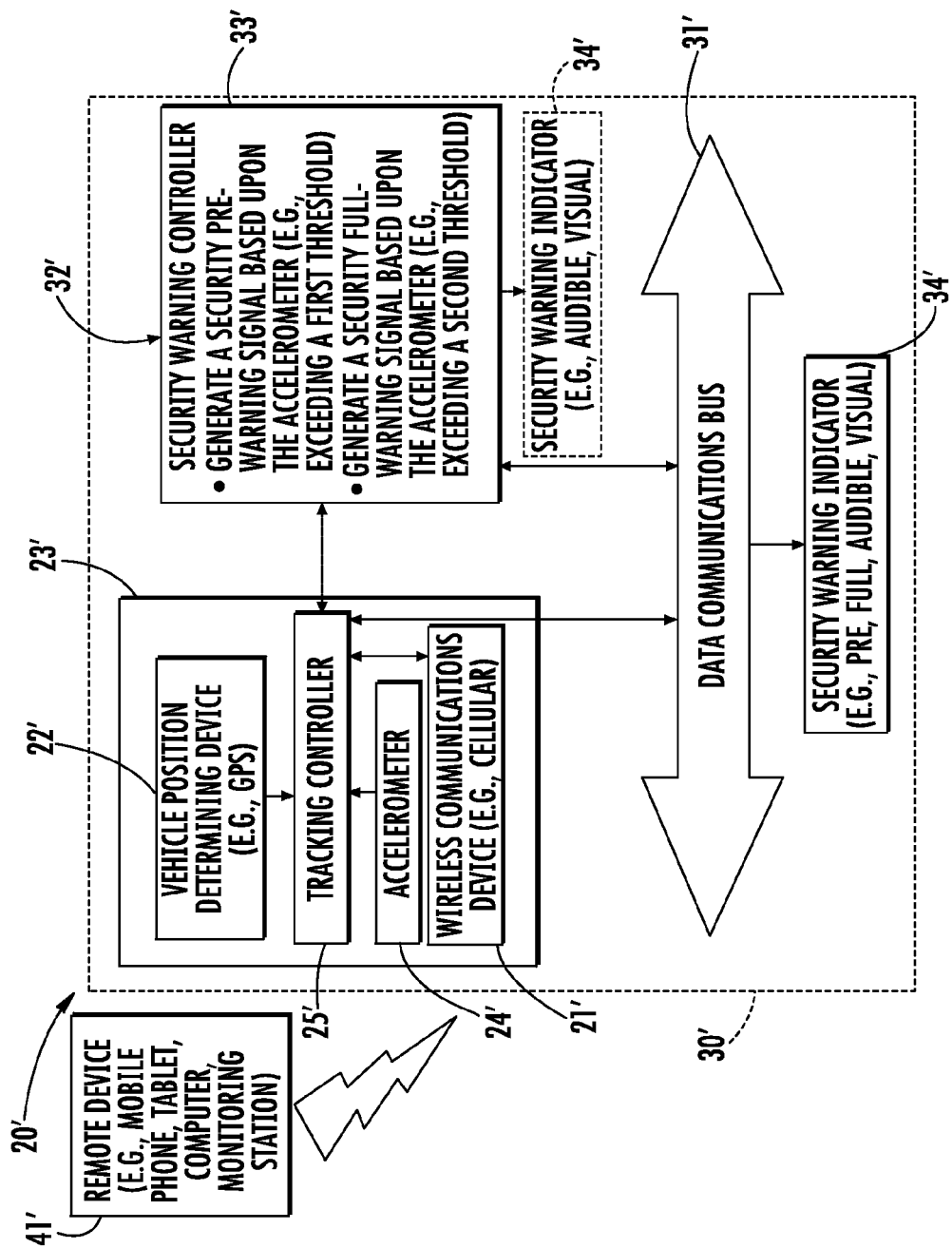
FIG. 2 is a schematic diagram of a vehicle control system in accordance with another embodiment of the present invention.

Referring now to FIG. 2, in another embodiment, the security warning controller 32' is configured to generate a security pre-warning signal based upon the accelerometer 24'. For example, the security warning controller 32' may be configured to generate the security pre-warning signal based upon a first threshold level corresponding to vehicle acceleration data that may be indicative of a low security threat level. The security warning indicator 34' may output a security pre-warning indication at the vehicle based upon the security pre-warning signal. The security pre-warning indication may be several short chirps of an audible siren, for example. Of course, the security pre-warning indication may be another type of indication, as will be appreciated by those skilled in the art.

If the vehicle acceleration data is indicative of a higher security threat level, for example, if the vehicle acceleration data corresponds to or exceeds a second threshold level, which may occur if a security threat persists for a threshold time period or if a sensed acceleration is of a higher magnitude, the security warning controller 32' may generate a security full-warning signal. The security warning indicator 34' may generate the security full-warning indication at the vehicle based upon the security full-warning signal.

Further details of a pre-warn indication are disclosed in U.S. Pat. Nos. 7,489,233, 7,501,937, 7,576,637, and 8,432,268 all to the same inventor as the present application, all assigned to the assignee of the present application, and the entire contents of all of which are hereby incorporated by reference. As will be appreciated by those skilled in the art, the security warning controller 32' may generate the security full-warning signal, and thus the security full-warning indication, without first generating the security pre-warning signal. For example, if the acceleration goes from zero to exceeding the second threshold level in a relatively short time period or is indicative of a high threat level, the security controller 32' may generate the security full warning signal, and thus the security full warning indication, without first generating the security pre-warning signal. It will be appreciated that, as described above, in some embodiments, the security warning controller 32' may also communicate via the tracking controller 25' to wirelessly send either or both of the security pre-warning or full-warning signals to the remote device 41' via the wireless communications device 21' so that the remote device operates as a remote security pre-warning and full-warning indicator remote from the vehicle 30'.

Figure 3:
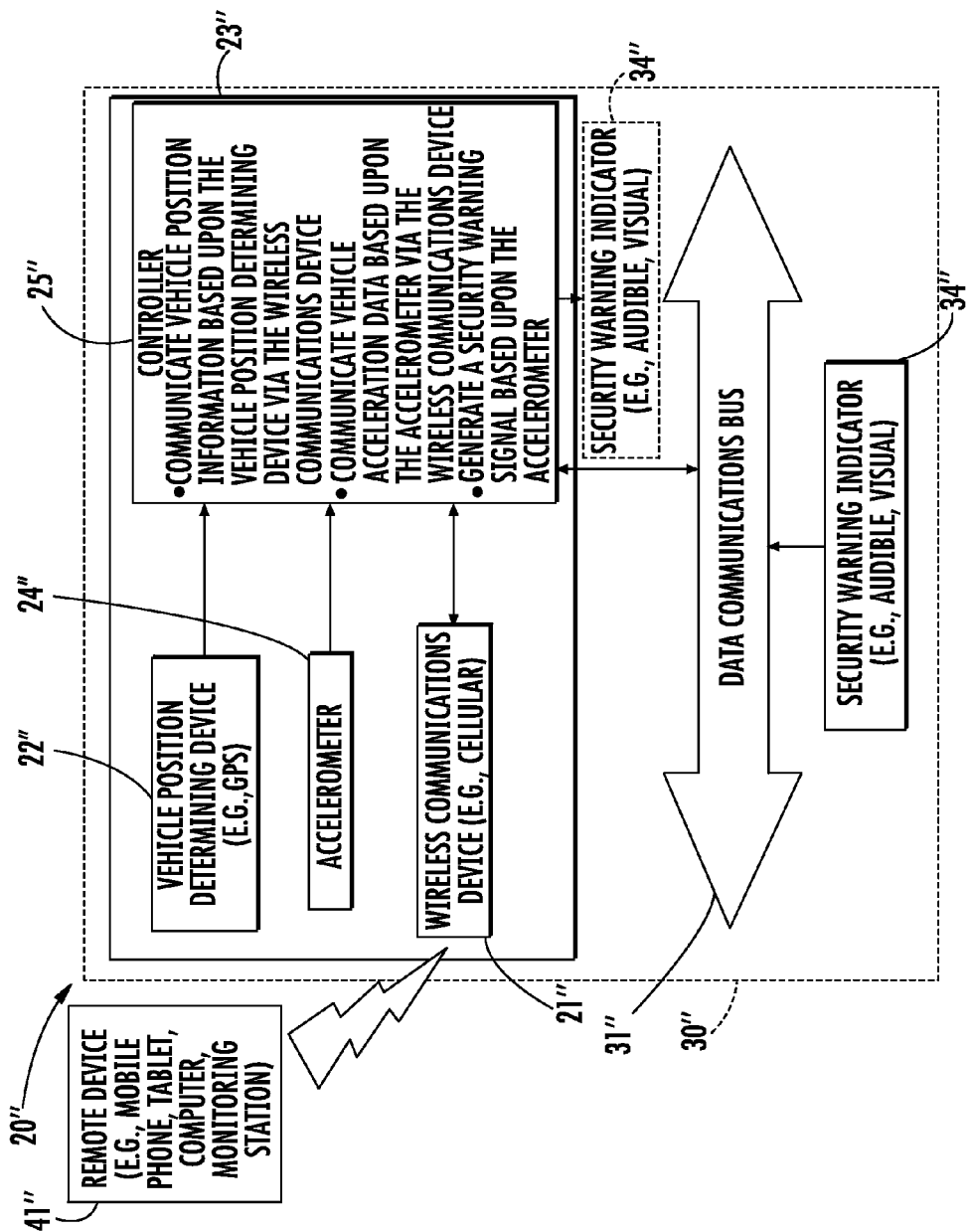
FIG. 3 is a schematic diagram of a vehicle control system in accordance with yet another embodiment of the present invention.

Referring now to FIG. 3, it will be appreciated that while a tracking controller 25 and a security warning controller 34 are described as being carried by first and second housings 23, 33, respectively, the functions of the controllers can be combined. Illustratively, in one embodiment, the tracking controller 25", which may be collocated with the accelerometer 24" and/or vehicle position determining device 22", may be programmed to also perform the functions described above with respect to the security warning controller 32. In some embodiments, the tracking controller 25 and the security controller 32 may be carried by a single housing, for example.

A method aspect is directed to a method of generating a security warning signal for a vehicle control system 20 that includes a wireless communications device 21, a vehicle position determining device 22, an accelerometer 23, and a controller 25 configured to communicate vehicle position information based upon the vehicle position determining device via the wireless communications device and communicating vehicle acceleration data based upon the accelerometer via the wireless communications device. The method includes using the controller 25 to generate the security warning signal based upon the accelerometer 23.

Figure 4:
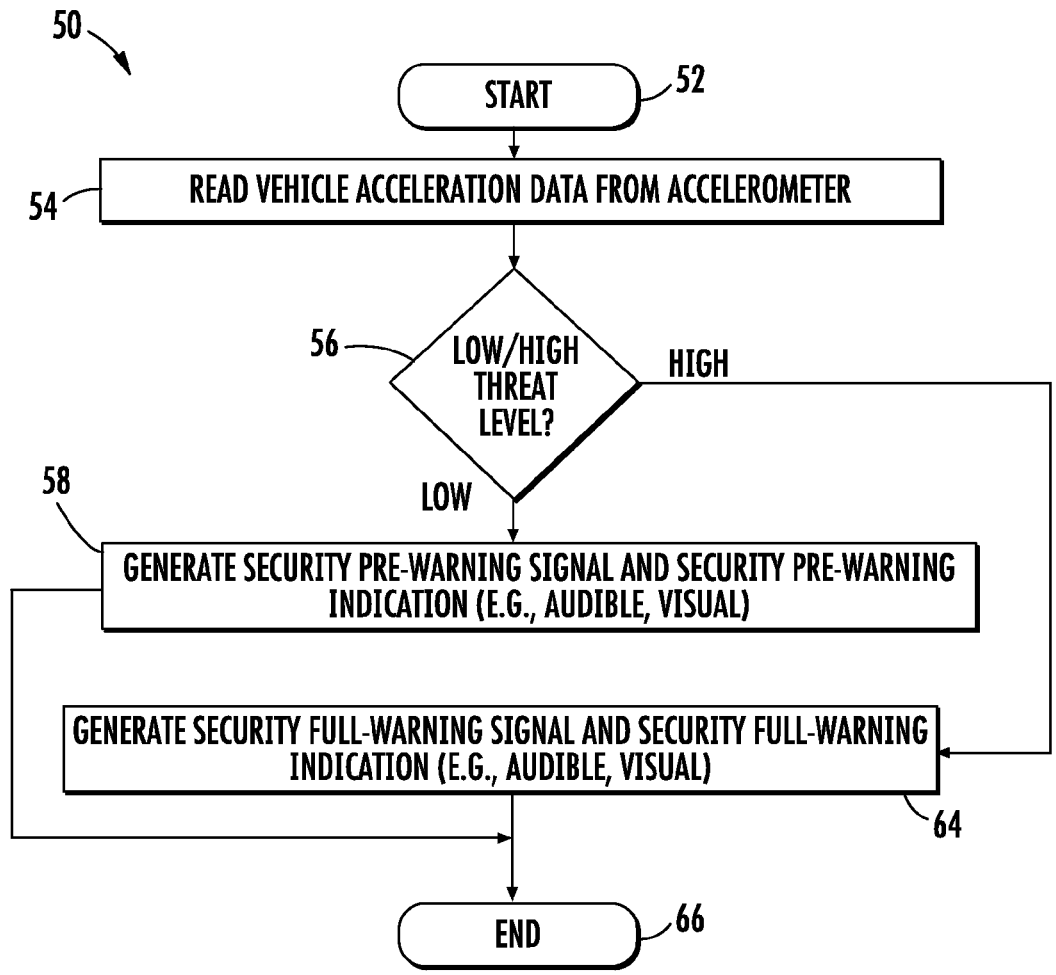
FIG. 4 is a flow diagram of a method of generating a security warning signal according to an embodiment of the present invention.
Figure 5:
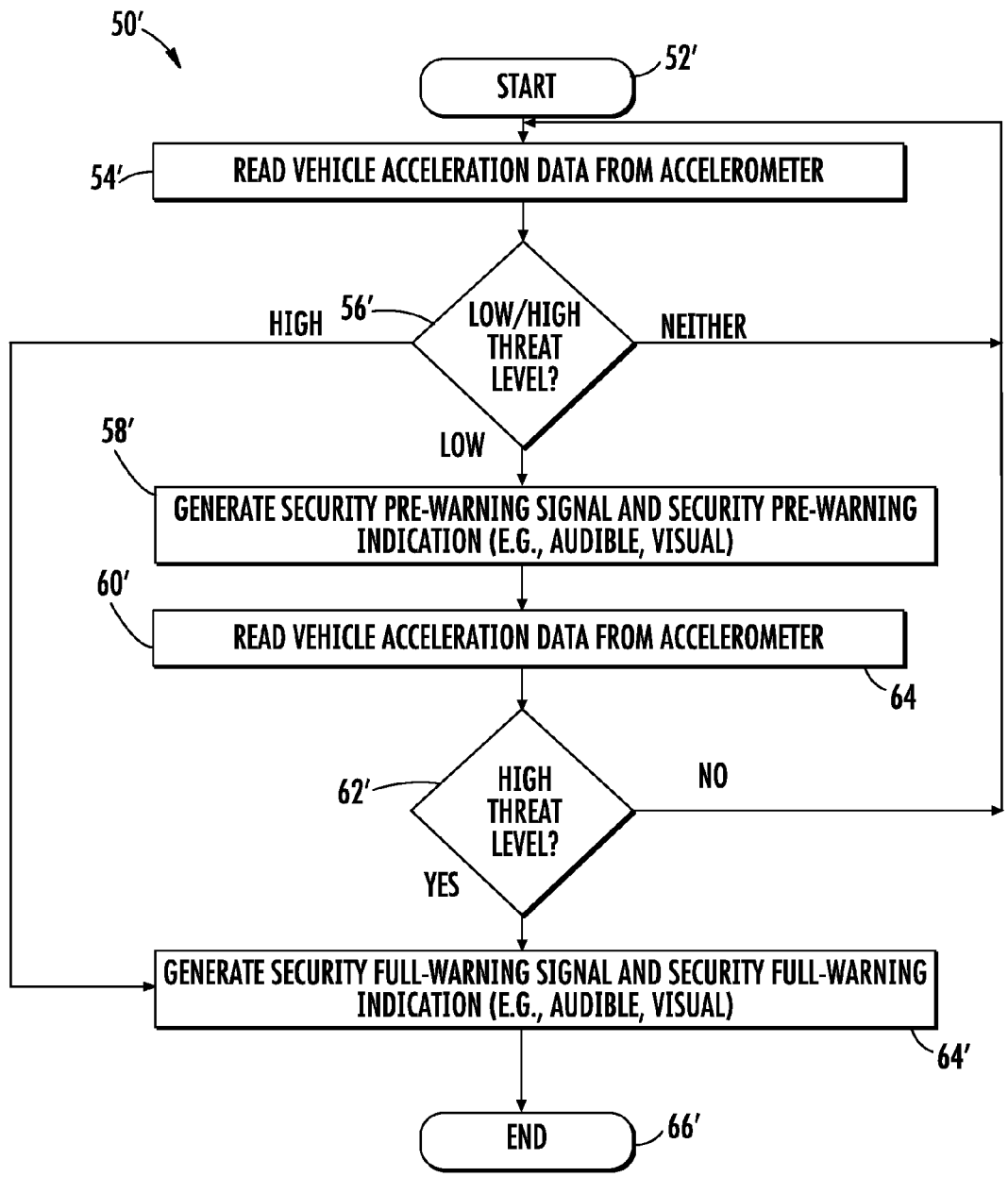
FIG. 5 is a flow diagram of a method of generating a security warning signal according to another embodiment of the present invention.

Referring now to the flowchart 50 in FIG. 4, beginning at Block 52, another method aspect includes, at Block 54, reading vehicle acceleration data from the accelerometer 24. At Block 56, the method includes determining whether the vehicle acceleration data exceeds a first threshold or is indicative of a low threat level, or a second threshold or is indicative of a high threat level. A low threat level may be achieved, for example, when a person or object "taps" the vehicle 30. If the vehicle acceleration data is indicative of a low threat level, the controller 25 generates a security pre-warning signal (Block 58). A security pre-warning indication (e.g., audible and/or visual) is generated at the vehicle based upon the security pre-warning signal.

If, at Block 56 it is determined that the vehicle acceleration data exceeds the second higher threshold or is indicative of the high threat level, for example within a threshold time period, the controller 25 generates a security full-warning signal (Block 64). A security full-warning indication (e.g., audible and/or visual) is generated at the vehicle based upon the security full-warning signal. The method ends at Block 66.

Referring to the flowchart 50' in FIG. 6, in another embodiment, the controller 25 may generate the security full-warning signal, and thus the security full-warning indication, without first generating the security pre-warning signal. More particularly, at Block 56', the method includes determining whether the vehicle acceleration data is indicative of the low threat level or of a high threat level. If the vehicle acceleration data is indicative of the high threat level, the controller 25 generates a security full warning signal and thus a full security warning indication is generated at the vehicle (Block 64'). If the vehicle acceleration data is indicative of the low threat level, the controller 25 generates a security pre-warning signal and thus the security pre-warning indication is generated at the vehicle (Block 58'). The method ends at Block 66'.

As will be appreciated by those skilled in the art, the vehicle control system 20 advantageously may provide increased security based upon vehicle components that may already be provided by the vehicle manufacturer. Particularly, the vehicle control system 20 may cooperate with the accelerometer 24, which may be used for vehicle crash detection, to determine a security threat and generate a security warning indication based thereon.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A vehicle control system comprising:
   a wireless communications device;
   a vehicle position determining device;
   an accelerometer; and
   at least one controller configured to
      communicate vehicle position information to a remote device based upon said vehicle position determining device via said wireless communications device,
      communicate vehicle acceleration data based upon said accelerometer after engine starting and during vehicle movement via said wireless communications device to the remote device, and
      generate a security warning signal based upon said accelerometer prior to engine starting and when the vehicle is stationary.

2. The vehicle control system of claim 1, wherein said at least one controller is configured to generate a crash alert based upon said accelerometer.

3. The vehicle control system of claim 1, wherein said at least one controller is configured to cooperate with said wireless communications device to send the security warning signal remote from the vehicle.

4. The vehicle control system of claim 1, wherein the security warning signal comprises a security pre-warning signal.

5. The vehicle control system of claim 1, wherein the security warning signal comprises a security full-warning signal.

6. The vehicle control system of claim 1, wherein the vehicle control system is for a vehicle having a data communications bus extending throughout the vehicle; and wherein said at least one controller is coupled to the data communications bus.

7. The vehicle control system of claim 6, wherein said at least one controller is configured to communicate the vehicle acceleration data over the data communications bus.

8. The vehicle control system of claim 1, further comprising a security warning indicator coupled to said at least one controller to generate a security warning indication at the vehicle based upon the security warning signal.

9. The vehicle control system of claim 8, wherein the vehicle control system is for a vehicle having a data communications bus extending throughout the vehicle; and wherein said at least one controller is coupled to the data communications bus and configured to communicate the security warning indication over the data communications bus.

10. The vehicle control system of claim 8, wherein said security warning indicator comprises an audible security warning indicator.

11. The vehicle control system of claim 8, wherein said security warning indicator comprises a visual security warning indicator.

12. The vehicle control system of claim 1, wherein said wireless communications device comprises a cellular communications device.

13. The vehicle control system of claim 1, wherein said vehicle position determining device comprises a global positioning system (GPS) device.

14. The vehicle control system of claim 1, wherein said accelerometer comprises at least one microelectromechanical system (MEMS) device.

15. The vehicle control system of claim 1, wherein said at least one controller comprises a tracking controller and a security controller cooperating therewith.

16. A vehicle control system comprising:
a wireless communications device;
a vehicle position determining device;
an accelerometer; and
at least one controller configured to
communicate vehicle position information based upon said vehicle position determining device via said wireless communications device to a remote device,
communicate vehicle acceleration data based upon said accelerometer after engine starting and during vehicle movement via said wireless communications device to the remote device, and
generate a security pre-warning signal based upon said accelerometer prior to engine starting and when the vehicle is stationary, and
generate a security full-warning signal also based upon said accelerometer prior to engine starting and when the vehicle is stationary.

17. The vehicle control system of claim 16, wherein said at least one controller is configured to generate a crash alert based upon said accelerometer.

18. The vehicle control system of claim 16, wherein said at least one controller is configured to cooperate with said wireless communications device to send at least one of the security pre-warning warning signal and the security full-warning signal remote from the vehicle.

19. The vehicle control system of claim 16, wherein the security pre-warning signal has a first threshold of vehicle acceleration data associated therewith, and wherein the security full warning signal has a second threshold of vehicle acceleration data associated therewith greater than the first threshold.

20. The vehicle control system of claim 16, wherein the vehicle control system is for a vehicle having a data communications bus extending throughout the vehicle; and wherein said at least one controller is coupled to the data communications bus.

21. The vehicle control system of claim 20, wherein said at least one controller is configured to communicate the vehicle acceleration data over the data communications bus.

22. The vehicle control system of claim 16, further comprising a security warning indicator coupled to said at least one controller to generate a security warning indication at the vehicle based upon at least one of the pre-warning security signal and the full-warning security signal.

23. The vehicle control system of claim 22, wherein the vehicle control system is for a vehicle having a data communications bus extending throughout the vehicle; and wherein said at least one controller is coupled to the data communications bus and configured to communicate the security warning indication over the data communications bus.

24. The vehicle control system of claim 22, wherein said security warning indicator comprises at least one of an audible security warning indicator and a visual security warning indicator.

25. The vehicle control system of claim 16, wherein said wireless communications device comprises a cellular communications device.

26. The vehicle control system of claim 16, wherein said vehicle position determining device comprises a global positioning system (GPS) device.

27. A method of generating a security warning signal for a vehicle control system comprising a wireless communications device, a vehicle position determining device, an accelerometer, and at least one controller configured to communicate vehicle position information to a remote device based upon the vehicle position determining device via the wireless communications device and communicating vehicle acceleration data based upon the accelerometer after engine starting and during vehicle movement via the wireless communications device to the remote device, the method comprising:
using the at least one controller to generate the security warning signal based upon the accelerometer prior to engine starting and when the vehicle is stationary.

28. The method of claim 27, further comprising using the at least one controller to generate a crash alert based upon the accelerometer.

29. The method of claim 27, further comprising using the at least one controller to send the security warning signal remote from the vehicle via the wireless communications device.

30. The method of claim 27, wherein using the at least one controller to generate the security warning signal comprises using the at least one controller to generate a security pre-warning signal.

31. The method of claim 27, wherein using the at least one controller to generate the security warning signal comprises using the at least one controller to generate a security full-warning signal.

32. The method of claim 27, wherein the vehicle control system is for a vehicle having a data communications bus extending throughout the vehicle, wherein the security pre-warning signal is generated using the at least one controller coupled to the data communications bus.

33. The method of claim 32, wherein the vehicle acceleration data is communicated over the data communications bus.

34. The method of claim 27, further comprising generating a security warning indication at the vehicle, via a security warning indicator, based upon the security warning signal.

35. The method of claim 34, wherein the vehicle control system is for a vehicle having a data communications bus extending throughout the vehicle; and wherein the security warning indication is communicated over the data communications bus.

36. The method of claim 34, wherein using the at least one controller to generate the security warning indication comprises using the at least one controller to generate at least one of an audible security warning indication and a visual security warning indication.

* * * * *